(12) United States Patent
Ashbaugh

(10) Patent No.: US 11,845,313 B1
(45) Date of Patent: Dec. 19, 2023

(54) TRUCK TRAILER WITH RETRACTABLE WHEELS FOR USE WITH A RAILROAD TRACK

(71) Applicant: Randall Karl Ashbaugh, Truth or Consequences, NM (US)

(72) Inventor: Randall Karl Ashbaugh, Truth or Consequences, NM (US)

(*) Notice: Subject to any disclaimer, the term of this patent is extended or adjusted under 35 U.S.C. 154(b) by 152 days.

(21) Appl. No.: 17/196,532

(22) Filed: Mar. 9, 2021

Related U.S. Application Data

(60) Provisional application No. 62/986,963, filed on Mar. 9, 2020.

(51) Int. Cl.
| | | |
|---|---|---|
| *B60F 1/04* | (2006.01) | |
| *B62D 61/12* | (2006.01) | |
| *B61F 5/50* | (2006.01) | |
| *B60F 1/00* | (2006.01) | |

(52) U.S. Cl.
CPC ............ *B60F 1/046* (2013.01); *B60F 1/00* (2013.01); *B61F 5/50* (2013.01); *B62D 61/12* (2013.01); *B60F 1/04* (2013.01)

(58) Field of Classification Search
CPC .... B60F 1/00; B60F 1/04; B60F 1/043; B60F 1/046; B60F 2301/00; B60F 2301/04; B60F 2301/10; B61F 1/00; B61F 1/14; B61F 3/02; B61F 3/125; B61F 5/50; B62D 61/12; B61D 3/184

See application file for complete search history.

(56) References Cited

U.S. PATENT DOCUMENTS

| | | | | |
|---|---|---|---|---|
| 3,130,688 A | * | 4/1964 | Gutridge | B60F 1/00 280/6.151 |
| 3,286,654 A | * | 11/1966 | Fisher | B61D 3/184 105/215.2 |
| 3,332,362 A | * | 7/1967 | Fisher | B60F 1/043 105/215.2 |
| 4,537,137 A | * | 8/1985 | White, Jr. | B62D 49/007 105/72.2 |
| 4,841,872 A | * | 6/1989 | Wicks | B61F 3/12 105/4.3 |

(Continued)

FOREIGN PATENT DOCUMENTS

WO    WO-02051657 A2 * 7/2002 ............ B60F 1/043

*Primary Examiner* — S. Joseph Morano
*Assistant Examiner* — Cheng Lin
(74) *Attorney, Agent, or Firm* — Plager Schack LLP; Mark H. Plager; Naomi Mann

(57) ABSTRACT

A truck trailer system including a connector vehicle with retractable wheels that are designed to engage with a railroad track is provided. The connector vehicle includes main wheels and at least one pair of secondary wheels, and an actuator assembly operably connected to the pair of secondary wheels. The actuator assembly is designed to actuate in a first direction to extend the pair of secondary wheels to engage with the railroad track, and in a second direction to retract the pair of secondary wheels to disengage with the railroad track. The truck trailer system may include a reinforcement assembly comprising at least one cable provided within a conduit, for connecting multiple units to be pulled at the same time via truck or locomotive. In embodiments, the reinforcement assembly may enable hauling of at least 10, or up to about 50 units via a single locomotive.

14 Claims, 4 Drawing Sheets

(56) References Cited

U.S. PATENT DOCUMENTS

| | | | | |
|---|---|---|---|---|
| 6,786,158 B2* | 9/2004 | Jacob | ............... | B61D 15/00 |
| | | | | 105/72.2 |
| 7,201,106 B2* | 4/2007 | Whiston | ............ | B61D 15/00 |
| | | | | 105/72.2 |
| 2007/0045046 A1* | 3/2007 | Hayes | ............... | A01M 31/02 |
| | | | | 182/63.1 |
| 2007/0089637 A1* | 4/2007 | Sproat | ............... | B61D 3/184 |
| | | | | 105/72.2 |
| 2014/0015223 A1* | 1/2014 | Banwart | ......... | B62D 53/0821 |
| | | | | 280/476.1 |

* cited by examiner

TRUCK TRAILER WITH RETRACTABLE WHEELS FOR USE WITH A RAILROAD TRACK

RELATED APPLICATION

This application claims priority to provisional patent application U.S. Ser. No. 62/986,963 filed on Mar. 9, 2020, the entire contents of which is herein incorporated by reference.

BACKGROUND

The embodiments herein relate generally to transportation systems for freight, and more specifically to vehicles used in such transportation systems.

Truck trailers are typically used to transport goods, equipment, and other items. In many situations, the load may be transferred from the truck to a train station for rail transport. This may involve lifting the trailer load off the truck by a crane and maneuvering it onto railroad cars, which may be a time consuming and expensive process. Additionally, a locomotive transport system is limited in the number of trailers it is capable of hauling by a single locomotive.

As such, there is a need in the industry for a more efficient system for freight transport.

SUMMARY

According to various embodiments, disclosed is a truck trailer system for transport of goods, comprising a dolly and/or truck trailer with retractable wheels that are configured to engage with a railroad track.

In embodiments, the truck trailer and/or dolly may comprise a plurality of main wheels coupled to a bottom of the trailer or dolly and a pair of secondary wheels coupled to a frame, and an actuator operably connected to the pair of secondary wheels, wherein the actuator is configured to actuate in a first direction to extend the pair of secondary wheels to engage with the railroad track, and wherein the actuator is configured to actuate in a second direction to retract the pair of secondary wheels to disengage with the railroad track. Additionally, a strengthening cable system is provided to enable a locomotive to transport over 10, or over 20, or over 30 connected trailers at once. In some embodiments, the disclosed assembly may be used to transport up to about 50 connected trailers by one locomotive.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

According to various embodiments, disclosed is a truck trailer system comprising a wheeled connector vehicle comprising both road wheels and retractable railroad wheels. In embodiments, the connector vehicle is configured for connection to a prime moving powered unit (e.g. semi-truck cab, tractor, truck, etc.), or to an attachment thereof, for hauling a load. According to various embodiments, the connector vehicle may be a dolly. In some embodiments, the connector vehicle may be a trailer, (e.g. full or semi-trailer). In some embodiments, the connector vehicle may be unpowered. However, in other embodiments, the connector vehicle may itself be powered.

Figure 1:
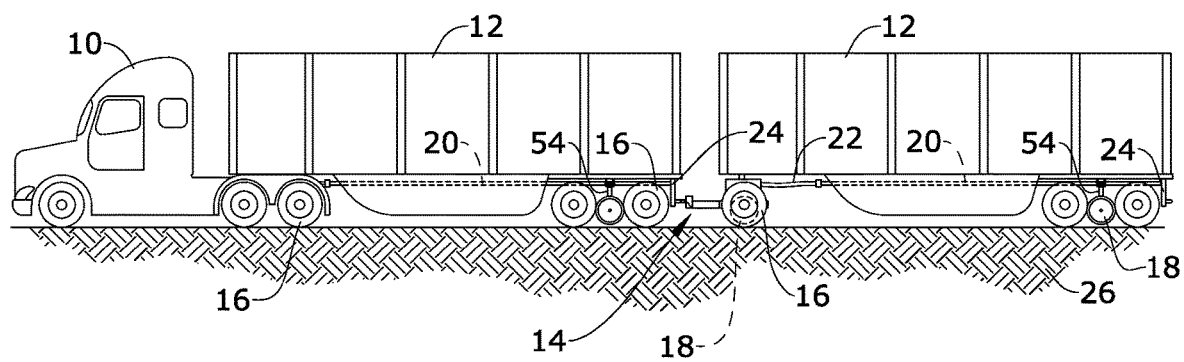
FIG. 1 depicts certain embodiments of a truck trailer including hauling assembly on a road.

In one embodiment as depicted in FIG. 1, a hauling assembly may comprise a load such as trailer transport boxes 12 coupled to semi-truck cab or truck 10. In some embodiments, each transport box 12 may be provided with coupling dolly assembly 14. In embodiments, each coupling dolly assembly 14 may be configured to attach to a dolly assembly 14 of an adjacent trailer transport box 12. In embodiments, a plurality of road wheels and tires 16, which are configured to travel on a road or ground 26 may be provided in the truck 10, and coupling dolly assembly 14, wherein coupling dolly assembly 14 may further comprise retractable railroad wheels 18 as will be described.

Figure 6:
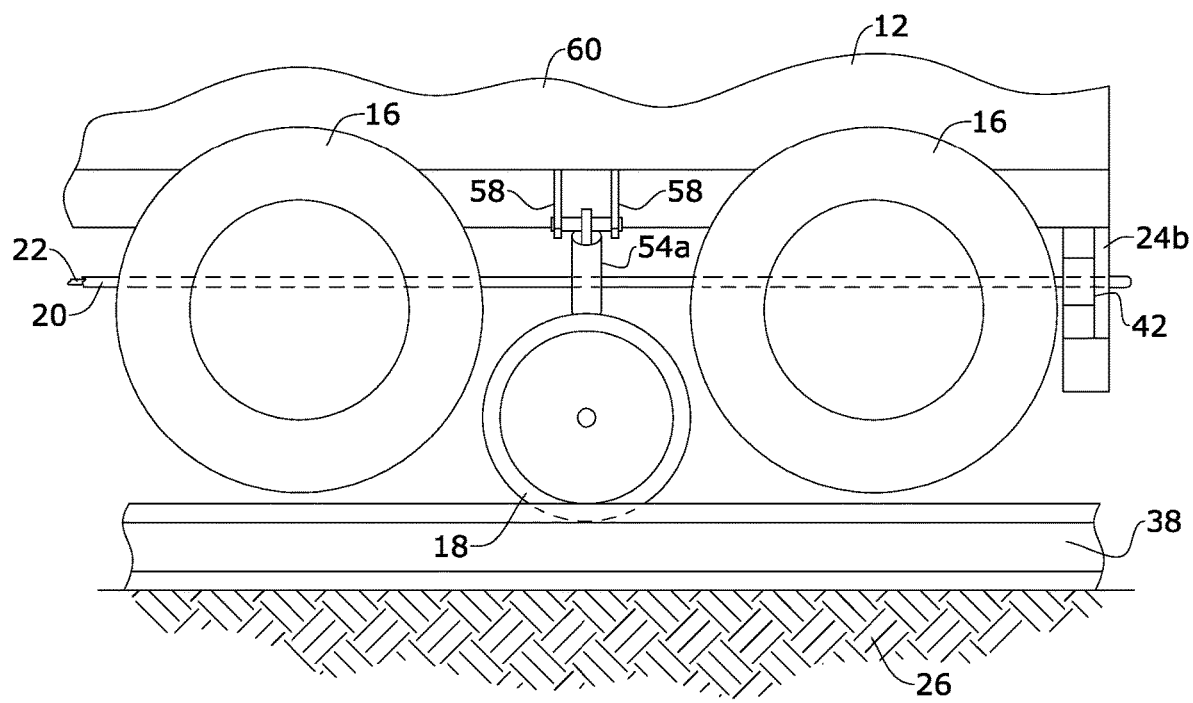
FIG. 6 depicts a side view of a rear portion of a trailer according to certain embodiments.
Figure 7:
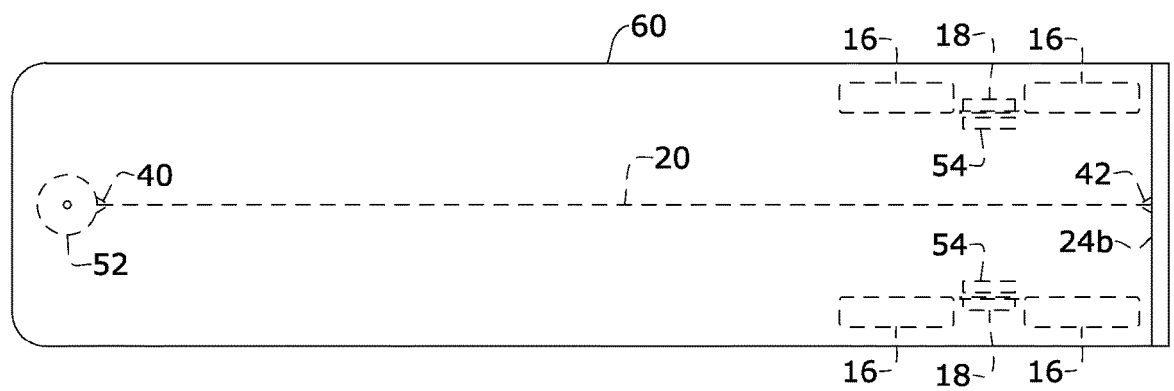
FIG. 7 depicts a top view of certain embodiments of the trailer.

In some other embodiments, as shown in FIGS. 6 and 7, trailer 60 may be used instead of, or in conjunction with coupling dolly assembly 14 for hauling a load such as transport box(s) 12, via truck 10, wherein trailer 60 may comprise retractable railroad wheels 18.

Figure 2:
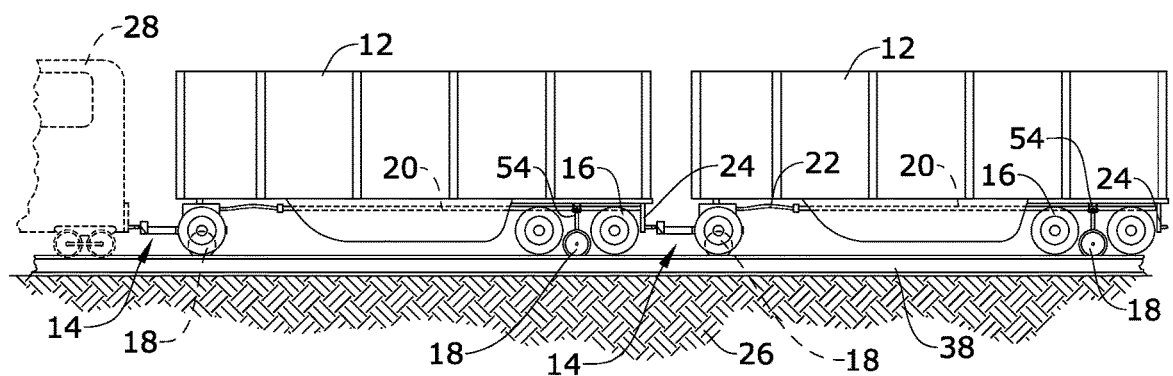
FIG. 2 depicts certain embodiments of the hauling assembly of FIG. on a railroad track.

FIG. 1 depicts a series of trailer transport boxes 12 connected together and pulled by truck 10, according to various embodiments. In this arrangement, railroad wheels 18 may be in a retracted position to permit tires 16 to travel on ground 26. FIG. 2 depicts the same series of trailer transport boxes 12 connected together and pulled by train locomotive 28. In this embodiment, railroad wheels 18 may be in an extended position to permit the series of transport boxes 12 to travel on railroad track 38. Additionally, as shown in FIGS. 1 and 2, any number of steel cables 22 within conduits 20 may be coupled to the plurality of connected trailer transport boxes 12 to enhance the strength of the hauling assembly for enabling multiple trailer transport boxes 12 to be pulled at the same time. This is particularly advantageous in strengthening the hauling assembly for locomotive transport, and enabling multiple units to be pulled at the same time.

In embodiments, steel cable 22 may comprise a stranded/twisted steel cable such as cables used for cranes. In embodiments, conduit 20 may be a steel pipe, such as a Schedule 40 steel pipe conduit. In embodiments, the steel cable and conduit connection between trailer transport boxes 12 reinforces the strength of the hauling assembly and may enable the assembly to haul over 10, or over 20, or over 30 trailer transport boxes by a single locomotive 28. In some embodiments, the reinforced assembly may transport up to about 50 transport boxes 12 by a single locomotive.

Figure 3:
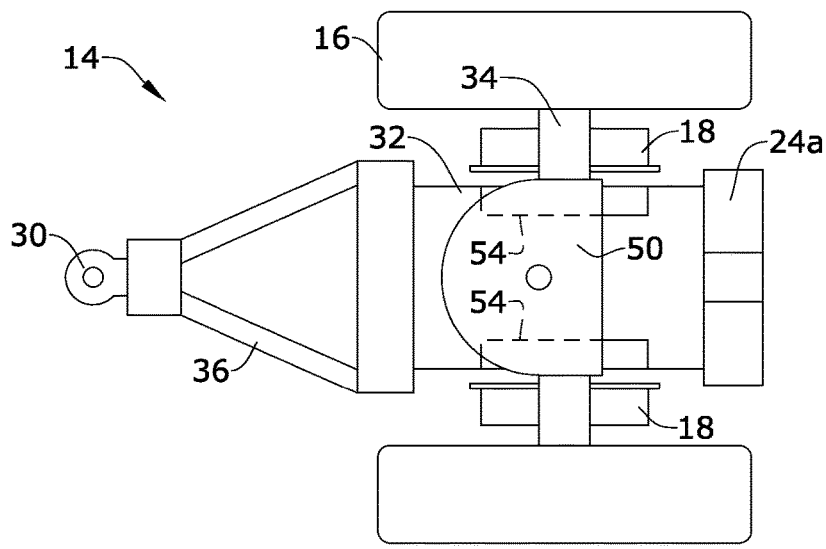
FIG. 3 depicts a top view of certain embodiments of a coupling dolly assembly.
Figure 4:
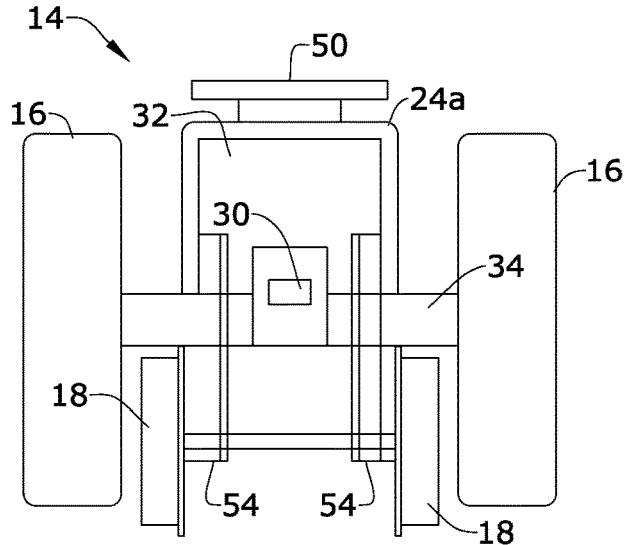
FIG. 4 depicts an end view of certain embodiments of the coupling dolly assembly of FIG. 3.
Figure 5:
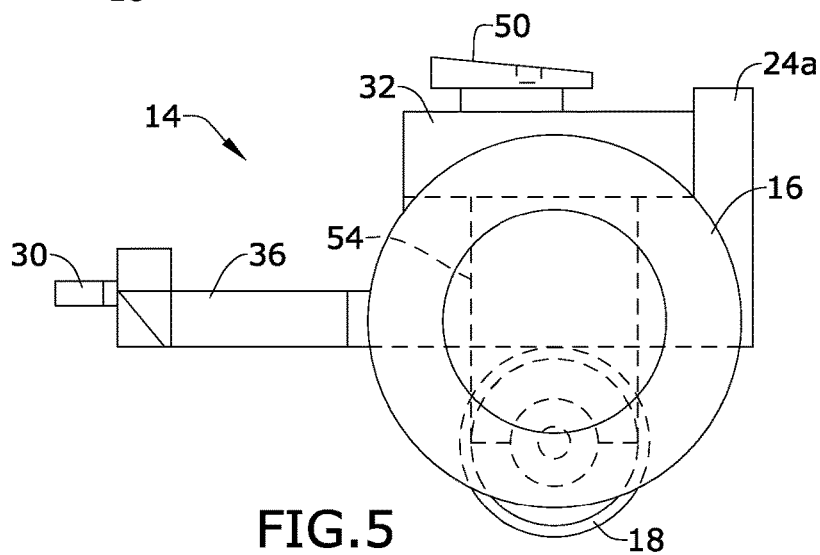
FIG. 5 depicts a side view of certain embodiments of the coupling dolly assembly of FIG. 3.

In one embodiment as best depicted in FIGS. 3-5, coupling dolly assembly 14 may comprise at least one pair of railroad wheels 18, including actuation system 54, which may be movable between a retracted position and an extended position. In the retracted position, railroad wheels 18 permit dolly assembly 14 to travel on ground 26 via tires 16. In the extended position, railroad wheels 18 extend below tires 16, such that the dolly assembly may travel on track 38 via wheels 18, with tires 16 lifted off the ground.

In certain embodiments, dolly assembly 14 may generally comprise a frame formed by reinforced back dolly plate 24a, reinforced hitch 30, reinforced center pull plate 32, and brace 36. In embodiments, reinforced back dolly plate 24a may include a hitch assembly. In one embodiment, reinforced center pull plate 32 may be coupled to brace 36 and reinforced back trailer plate 24a. A pair of tires 16 may be coupled together by axle 34, which may extend perpendicularly to the longitudinal axis of coupling dolly assembly 14. In some embodiments, dolly assembly 14 may further comprise a fifth wheel plate 50 which may be configured to couple to another vehicle, such as trailer 60, or truck 10 via the steel cable 22/conduit 20 system connection.

In one embodiment, brace 36 of each coupling dolly assembly 14 may be coupled to reinforced hitch 30, which may be configured to permit attachment of another trailer transport box 12 thereto. Specifically, hitch assembly of reinforced back trailer plate 24a of a first trailer transport box 12 may engage with reinforced hitch 30 of another coupling dolly assembly 14 on a following trailer transport box 12. In some embodiments, dolly assembly 14 may couple to semi-truck 10 or trailer 60, via fifth wheel plate 50 or hitch 30.

In embodiments, actuation system 54 is configured to actuate in a first direction to extend the pair of railroad wheels 18 to engage with railroad track 38. The actuation system is further configured to actuate in a second direction to disengage the pair of railroad wheels 18 from railroad track 38. More specifically, in the extended position, railroad wheels 18 may extend below tires 16, such that tires 16 will be lifted above railroad wheels 18, to permit railroad wheels 18 to contact track 38. In the retracted position, railroad wheels 18 will position above tires 16, to permit tires 16 to contact ground 26.

In certain embodiments as best depicted in FIGS. 6 and 7, trailer 60 may comprise at least one pair of railroad wheels 18, which may be movable between a retracted position for traveling on ground 26, and an extended position for traveling on track 38. In embodiments, trailer 60 may be a semi-trailer, comprising only rear tires 16, as best shown in FIG. 7. However, in other embodiments, trailer 60 may be a full trailer, that includes a fully supporting set of tires 16.

In embodiments, trailer 60 may comprise a connector 52 for coupling to truck 10. In certain embodiments, trailer 60 may include a reinforced back trailer plate 24b having a hitch assembly. Additionally, steel cable 22 within conduit 20 may be coupled to reinforced back trailer plate 24b and include a connector 40 for connection to a fifth wheel plate, such as plate 50. As such, trailer 60 may be connected to reinforced hitch 30 and/or fifth wheel plate 50 of dolly assembly 14, via back trailer plate 24b or connector 40 of trailer 60. In embodiments, the steel cable(s) 22/conduit(s) 20 provides a strengthened assembly that may enable a single locomotive to pull multiple units of over 10, or over 20, or over 30, on a railroad track. In some embodiments, the reinforced assembly may transport up to about 50 units by a single locomotive.

According to various embodiments, trailer 60 may be used for transport of a load such as trailer transport boxes 12. In embodiments, trailer 60 may be coupled to truck 10, or to an attachment thereof for road travel via tires 16. Alternatively trailer 60 may be coupled to train locomotive 28, or to an attachment thereof for traveling on railroad track 38 via tires 18.

Railroad wheels 18 may be coupled to semi-trailer 60 via actuation system 54. Actuation system 54 may be configured to actuate in a first direction to extend the pair of railroad wheels 18 on trailer 60 to engage with railroad track 38. The actuation system may further be configured to actuate in a second direction to retract the pair of railroad wheels 18 to disengage with railroad track 38, thus permitting tires 16 to contact the road.

Figure 8:
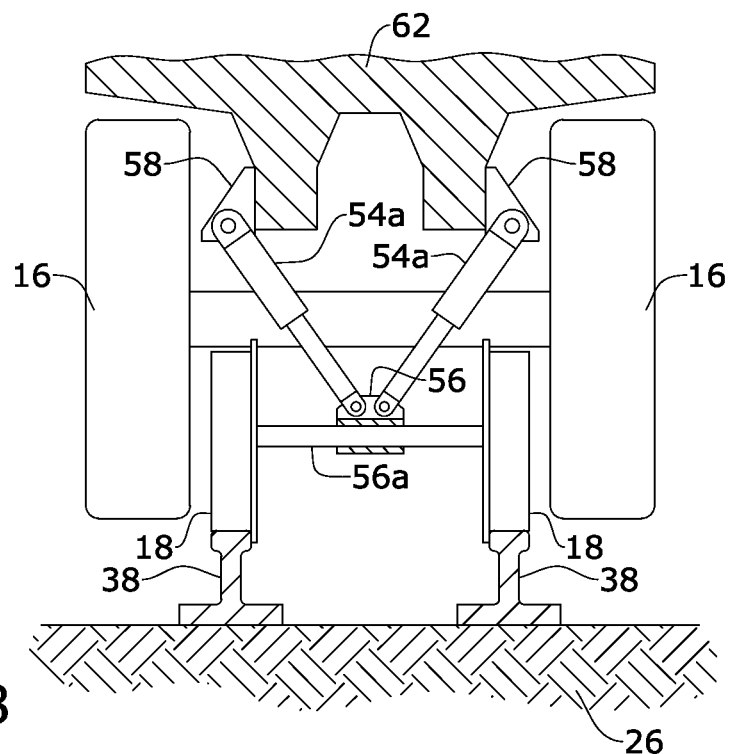
FIG. 8 depicts an actuation system for retractable railroad wheels, according to certain embodiments, showing the railroad wheels in an extended position for engagement with a railroad track.
Figure 9:
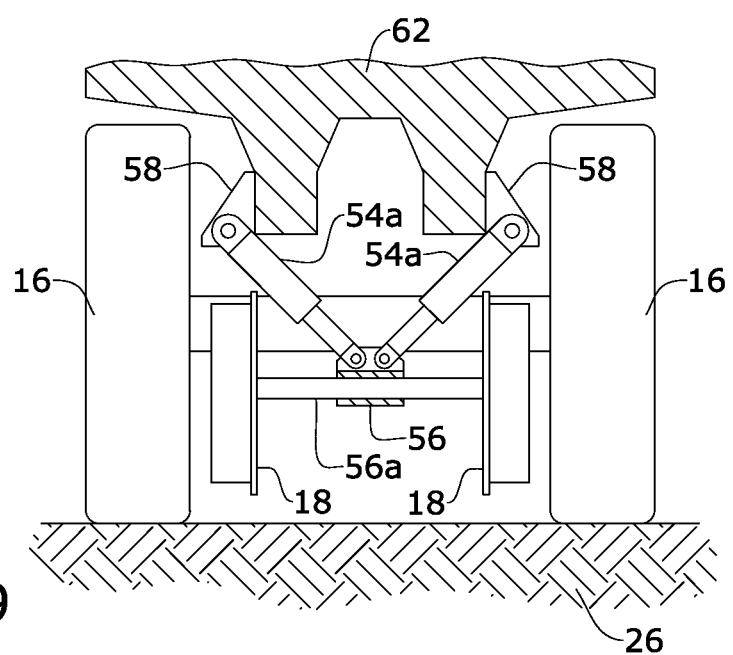
FIG. 9 depicts the actuation system with the railroad wheels in a retracted position.

In certain embodiments as best depicted in FIGS. 8 and 9, actuation system 54 may be coupled to a coupling bracket 62 provided on a bottom side of the connector vehicle (i.e. dolly assembly 14 or trailer 60). In embodiments, a pair of actuator brackets 58 may rotationally couple a pair of actuators 54a to coupling bracket 62 at top ends of the actuators. The bottom ends of the pair of actuators 54a may couple to an axle bracket 56 supporting axle 56a of railroad wheels 18. The pair of actuators 54a may be configured to extend or elongate, such that railroad wheels 18 may contact track 38, as shown in FIG. 8, or retract such that railroad wheels 18 may be lifted, leaving tires 16 to make contact with ground 26. According to various embodiments, actuation system 54 may be a hydraulic, pneumatic, and/or mechanical system.

Thus, the disclosed system may be used to haul any number of trailer transport boxes 12 or other load, on a road and alternatively on a railroad track, using dolly assembly 14, trailer 60, or combination thereof.

It shall be appreciated that the components of the truck trailer with retractable wheels described in several embodiments herein may comprise any known materials in the field and be of any color, size and/or dimensions. It shall be appreciated that the components of the truck trailer with retractable wheels described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A hauling assembly comprising:
   at least one connector vehicle comprising at least one pair of road wheels and at least one pair of retractable railroad wheels,
   wherein the connector vehicle is configured for connection to a prime moving powered unit or to an attachment thereof,
   wherein the connector vehicle is configured to haul at least one load unit via said prime moving powered unit,
   wherein the connector vehicle is further configured to connect to at least one other vehicle in hauling assembly via a reinforcement assembly including at least one steel cable within a conduit, wherein the pair of retractable railroad wheels are movable between a retracted position and an extended position, wherein in the retracted position, said pair of retractable railroad wheels permit said connector vehicle to travel on a road via said pair of road wheels, wherein in the extended position, said pair of retractable railroad wheels extend below said road wheels, such that the connector vehicle is configured to engage a railroad track via said pair of retractable railroad wheels, wherein the connector vehicle is a trailer, and wherein a rear side of the trailer includes a reinforced back trailer plate having a hitch assembly to which said at least one steel cable within said conduit may be attached.

2. The hauling assembly of claim 1, said trailer further including a fifth wheel connector configured for connection to a fifth wheel plate.

3. The hauling assembly of claim 2, wherein said trailer is configured for connection to a hitch and/or fifth wheel plate of dolly.

4. A hauling assembly comprising:

at least one connector vehicle comprising at least one pair of road wheels and at least one pair of retractable railroad wheels, wherein the connector vehicle is configured for connection to a prime moving powered unit or to an attachment thereof, wherein the connector vehicle is configured to haul at least one load unit via said prime moving powered unit, wherein the connector vehicle is further configured to connect to at least one other vehicle in hauling assembly via a reinforcement assembly including at least one steel cable within a conduit, wherein the pair of retractable railroad wheels are movable between a retracted position and an extended position, wherein in the retracted position, said pair of retractable railroad wheels permit said connector vehicle to travel on a road via said pair of road wheels, wherein in the extended position, said pair of retractable railroad wheels extend below said road wheels, such that the connector vehicle is configured to engage a railroad track via said pair of retractable railroad wheels, wherein the connector vehicle is a dolly, the dolly comprising a frame including a back plate including a hitch on a rear side of the frame, a front hitch on a front side of the frame, and a fifth wheel plate on a central portion of the frame between said back plate and said front hitch.

5. A hauling assembly comprising:

at least one connector vehicle comprising at least one pair of road wheels and at least one pair of retractable railroad wheels, wherein the connector vehicle is configured for connection to a prime moving powered unit or to an attachment thereof, wherein the connector vehicle is configured to haul at least one load unit via said prime moving powered unit, wherein the connector vehicle is further configured to connect to at least one other vehicle in hauling assembly via a reinforcement assembly including at least one steel cable within a conduit, wherein the pair of retractable railroad wheels are movable between a retracted position and an extended position, wherein in the retracted position, said pair of retractable railroad wheels permit said connector vehicle to travel on a road via said pair of road wheels, wherein in the extended position, said pair of retractable railroad wheels extend below said road wheels, such that the connector vehicle is configured to engage a railroad track via said pair of retractable railroad wheels, the assembly including at least 10 connector vehicles coupled to one another, each of said connector vehicles comprising said at least one pair of retractable railroad wheels.

6. A hauling assembly comprising:

at least one connector vehicle comprising at least one pair of road wheels and at least one pair of retractable railroad wheels, wherein the connector vehicle is configured for connection to a prime moving powered unit or to an attachment thereof, wherein the connector vehicle is configured to haul at least one load unit via said prime moving powered unit, wherein the connector vehicle is further configured to connect to at least one other vehicle in hauling assembly via a reinforcement assembly including at least one steel cable within a conduit, wherein the pair of retractable railroad wheels are movable between a retracted position and an extended position, wherein in the retracted position, said pair of retractable railroad wheels permit said connector vehicle to travel on a road via said pair of road wheels, wherein in the extended position, said pair of retractable railroad wheels extend below said road wheels, such that the connector vehicle is configured to engage a railroad track via said pair of retractable railroad wheels, wherein said reinforcement assembly strengthens a connection between a plurality of connector vehicles for locomotive transport.

7. The hauling assembly of claim 6, the prime moving powered unit comprising a locomotive, wherein the reinforcement assembly enables said hauling assembly to haul at least 10 load units via a single locomotive.

8. The hauling assembly of claim 6, wherein the connector vehicle is a trailer or dolly.

9. The hauling assembly of claim 6, wherein the prime moving powered unit is a truck or locomotive.

10. The hauling assembly of claim 6, wherein the connector vehicle is unpowered.

11. The hauling assembly of claim 6, wherein said retractable railroad wheels are coupled to said connector vehicle via an actuation assembly, wherein the actuation assembly is configured to move said pair retractable railroad wheels between said retracted positions and said extended position.

12. The hauling assembly of claim 11, said actuation assembly comprising at least one actuator coupling the pair of retractable railroad wheels to the connector vehicle, said actuator configured to elongate for moving said pair of retractable railroad wheels into said extended position.

13. The hauling assembly of claim 12, said actuation assembly comprising a pair of actuators; a pair of actuator brackets coupled to a coupling bracket of the connector vehicle, wherein each of said pair of actuator brackets is rotationally coupled to a top end of each of said pair of actuators to couple said pair of actuators to said connector vehicle; and axle bracket support an axle of said pair of railroad wheels, the axel bracket rotationally coupled to each of said pair of actuators on a bottom end of the actuators.

14. The hauling assembly of claim 11, wherein said actuation assembly is a pneumatic, hydraulic, or mechanical system.

\* \* \* \* \*